(12) United States Patent
Kwong

(10) Patent No.: US 6,647,500 B1
(45) Date of Patent: Nov. 11, 2003

(54) SYSTEM AND METHOD TO GENERATE A FLOAT VOLTAGE POTENTIAL AT OUTPUT WHEN FIRST AND SECOND POWER SUPPLIES FAIL TO SUPPLY POWER AT THE SAME TIME

(75) Inventor: Phillip M. L. Kwong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/524,102

(22) Filed: Mar. 13, 2000

(51) Int. Cl.$^7$ ................................................ G06F 1/26
(52) U.S. Cl. ...................................... 713/300; 713/330
(58) Field of Search .................................. 713/300, 330

(56) References Cited

U.S. PATENT DOCUMENTS

| | | | | |
|---|---|---|---|---|
| 5,420,798 A | * | 5/1995 | Lin et al. ..................... | 364/483 |
| 5,705,946 A | * | 1/1998 | Yin .............................. | 327/333 |
| 5,789,942 A | * | 8/1998 | Mizuno ........................ | 326/21 |
| 6,157,070 A | * | 12/2000 | Lin et al. ..................... | 257/392 |
| 6,166,561 A | * | 12/2000 | Fifield et al. ................. | 326/57 |
| 6,252,452 B1 | * | 6/2001 | Hatori et al. ................. | 327/544 |
| 6,288,591 B1 | * | 9/2001 | Riccio ......................... | 327/333 |
| 6,304,069 B1 | * | 10/2001 | Tatsumi ....................... | 323/312 |
| 2002/0089350 A1 | * | 7/2002 | Correale, Jr. et al. ......... | 326/83 |

* cited by examiner

Primary Examiner—Thomas Lee
Assistant Examiner—Nitin C. Patel
(74) Attorney, Agent, or Firm—Blakely, Sokoloff, Taylor & Zafman LLP

(57) ABSTRACT

A method and an apparatus for providing a float voltage potential in a bus connection are described. In one embodiment, a device has a first input, a second input, and an output. The first input is coupled to a first power supply and the second input is coupled to a second power supply. The device is configured to provide a float voltage potential at the output when the first and second power supplies supply the power at different time.

26 Claims, 5 Drawing Sheets

SYSTEM AND METHOD TO GENERATE A FLOAT VOLTAGE POTENTIAL AT OUTPUT WHEN FIRST AND SECOND POWER SUPPLIES FAIL TO SUPPLY POWER AT THE SAME TIME

FIELD OF THE INVENTION

The present invention pertains to the field of computer systems. More specifically, this invention relates to an input/output circuit.

BACKGROUND OF THE INVENTION

With the size of many electronic products becoming increasingly smaller, many electronic product designers are currently seeking to minimize power consumption. Generally, reducing the overall magnitude of voltage swings of CMOS circuits allows a reduction in power consumption. Thus, an electronic architecture that would allow and work with lower input voltage swings without drawing leakage current is desirable. However, many applications of CMOS circuits still use high voltages, which need to be accommodated. Consequently, it is necessary to support multiple power supplies, such as Vcc and VCCQ.

A problem with supporting multiple power supplies is an unknown state during the power-up state. For example, in a high voltage level shifter, if the high voltage VCCQ powers up before the supply voltage Vcc, the output of the level shifter is undetermined. An unknown state may cause bus contentions and, accordingly, may cause the system to fail.

DESCRIPTION OF THE DRAWINGS

The present invention is illustrated by way of example and not limitation in the figures of the accompanying drawings in which like references indicate similar elements and in which.

DETAILED DESCRIPTION

A device for providing a float voltage potential at the output in a system configuration is described. The device is designed to allow a component, such as nonvolatile writeable memory, to operate at one voltage level, while the surrounding system components operate at a second voltage level. To avoid bus contention, the device forces a float voltage potential at the output when the first power supply, VCCQ, is powered up first and the second power supply, Vcc, is powered up later.

Figure 1:
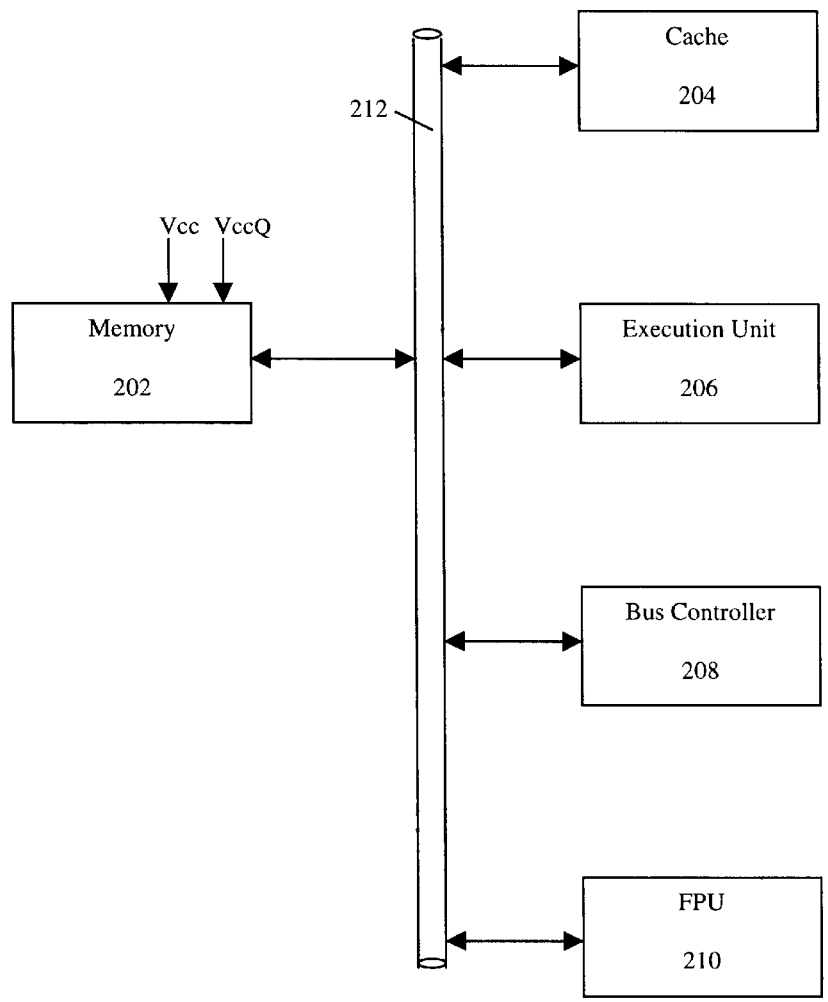
FIG. 1 illustrates a processor having multiple components.

FIG. 1 illustrates a processing device 200 having multiple components. Processing device 200 includes a bus 212, a cache 204, an execution unit 206, a bus controller 208, a floating point unit ("FPU") 210, and a memory 202. Bus 212 is coupled to cache 204, execution unit 206, bus controller 208, FPU 210, and memory 202.

In one embodiment, memory 202 is a nonvolatile electronically programmable and erasable memory, such as flash memory. Various instructions and data may be stored in memory 202. Memory 202 is designed to drive either a Vcc or VCCQ onto the bus when it drives the bus. Accordingly, memory 202 receives both Vcc and VCCQ power supplies.

Cache 204 holds portions of the program and data, which are most heavily accessed. Execution unit 206 executes instructions and programs. Bus controller 208 controls the various buses, such as bus 212 and internal CPU buses. FPU 210 is responsible to execute floating-point instructions.

Bus 212 may be driven by any component that is coupled to bus 212. Because every component coupled to bus 212 is capable of driving the bus 212, bus controller 208 provides a scheme that bus 212 can only be driven by component at a single given time. While only one component can drive at one given time, the remaining components could either be in receiving mode or non-driving mode. For example, a non-driving mode can be achieved by forcing a float voltage potential at the output node. The float voltage potential is too low of voltage potential to be considered as a logic one state and is too high of voltage potential to be considered as a logic zero state.

In one operation, the disclosed mechanism provides a float voltage potential at an input/output ("I/O") buffer, which is connected to the bus 212, during the initial power-on phase to reduce possible bus contentions. During the initial power-on phase, various components are powered up at different time frame, which may cause bus contentions. Accordingly, outputs of the components that are neither driving nor receiving from the bus 212 should be forced to float voltage potentials.

Processing device 200 could be used for various applications, such as personal computers, digital cameras, cellular phones, televisions, and Internet appliances.

Figure 2:
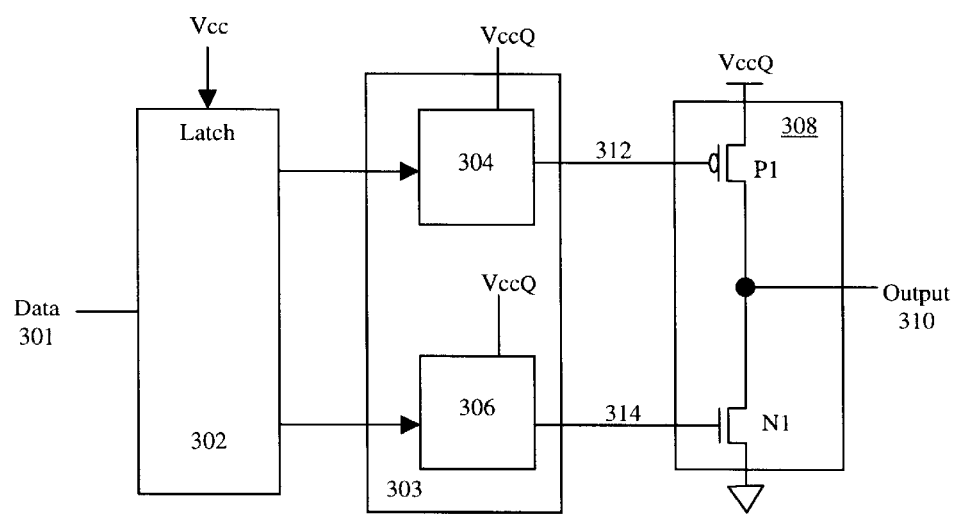
FIG. 2 illustrates a circuit including default devices.

FIG. 2 illustrates a buffer 300 including default devices. Buffer 300 contains a latch 302, a default circuit 303, and an output device 308. Default circuit 303 further includes two default devices 304 and 306. Latch 302 is coupled to default circuit 303 and the default circuit 303 is coupled to output device 308. Output 310 of output device 308 is further coupled to a bus such as a system bus.

Latch 302 could be a conventional latch or a high-voltage latch. Latch 302 latches data 301 at a previous clock cycle and makes the data 301 available at the current clock cycle. Default device 304 receives VCCQ power supply and is designed to output a high-voltage potential as a default value on line 312. Default device 306 also receives a VCCQ power supply and is designed to provide a low-voltage potential as a default value on line 314. Default devices 304 and 306 will be described in more detail below. Output device 308 consists of two transistors, namely a P-channel transistor P1 and an N-channel transistor N1. If both transistors P1 and N1 are off, output 310 is in a float voltage potential state.

In one operation, when VCCQ powers up before Vcc during an initial power-on phase, default devices 304–306 provide the default value to output device 308 in response to VCCQ and Vcc power supplies. Because default logic value from default device 304 is a logic 1, which turns off the transistor P1, and the default logic value from default device 306 is a logic 0, which turns off the transistor N1, a float voltage potential at the output 310 is formed.

Figure 3:
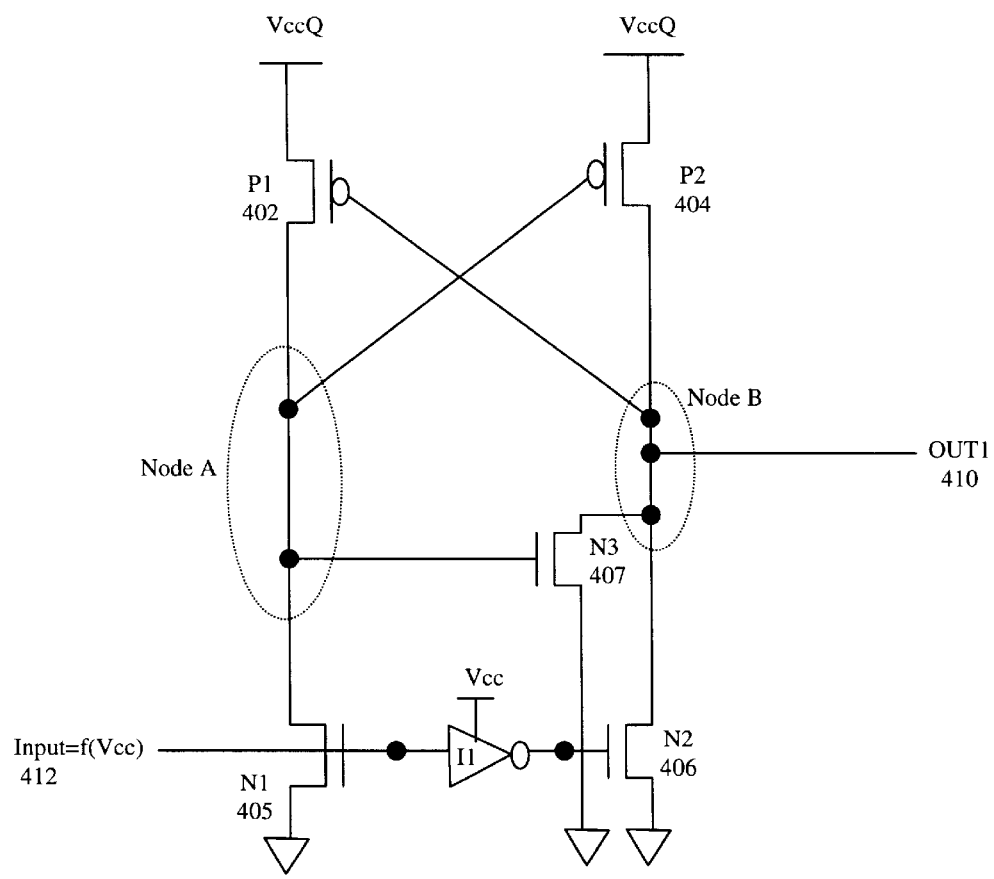
FIG. 3 illustrates a default circuit having a logic low default value.

FIG. 3 illustrates a default circuit 400 having a logic low default value. Circuit 400 contains two p-channel transistors P1–P2, three n-channel transistors N1–N3, and an inverter I1. The p-channel transistor is a P-MOS ("metal oxide semiconductor") and the N-channel transistor is an N-MOS transistor. Circuit 400 further receives an input signal 412, which is a function of Vcc power supply, and outputs an out1 410.

Each transistor includes a source, drain, and gate terminals and each inverter contains an input and output terminals. The source terminal of P1 402 is coupled to VCCQ power supply and the drain terminal of P1 402 is coupled to a node A. While the gate terminal of P1 402 is coupled to a node B, the gate terminal of P2 404 is coupled to the node A. The source terminal of P2 404 is coupled to VCCQ power supply while the drain terminal of P2 505 is coupled to the node B. The source terminal of N1 405 is coupled to ground power supply and the drain terminal of N1 405 is coupled to the node A. The gate terminal of N1 405 is coupled to the input 412 and the input terminal of inverter I1. The output of I1 is coupled to the gate terminal of N2 406. While the source terminal of N2 406 is coupled to the ground power supply, the drain terminal of N2 406 is coupled to the node B. The source terminal of N3 407 is coupled to the ground power supply and the drain terminal of N3 407 is coupled to the node B. While the gate terminal of N3 407 is coupled to the node A, the node B is connected to out1 410.

In one operation, circuit 400 provides a logic low voltage potential at out1 410 when VCCQ powers up before Vcc during a power-on stage. For example, when VCCQ power supply is on while Vcc power supply is off, the voltage potential begins to increase at both node A and node B because transistors N1–N2 are off. When the voltage potential at the node A reaches to the threshold voltage of N3 407, N3 407 starts to turn on. When N3 407 begins to turn on, the voltage potential at the node B will be pulled down. When the voltage potential goes down at the node B, P1 402 starts to turn on. Once P1 402 begins to turn on, the voltage potential at the node A goes higher, which keeps N3 407 to be on. Accordingly, a low voltage potential at out1 410 is formed when N3 407 is on.

Note that N3 407 could cause driving contentions with N1 405 or N2 406 during normal operation. Thus, proper sizing of N3 407, which should be relatively small than N1 405 and N2 406, is needed to reduce the effect of driving contentions.

Figure 4:
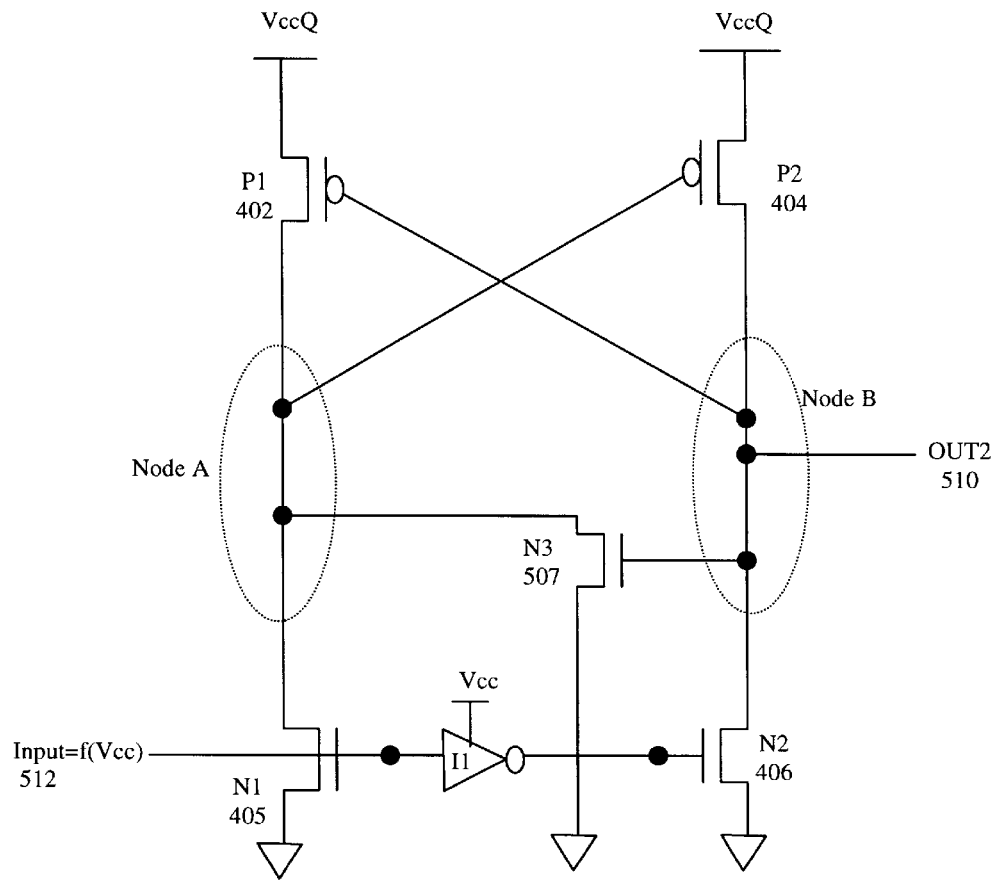
FIG. 4 illustrates a default circuit having a logic high default value.

FIG. 4 illustrates a default circuit 500 having a logic high default value. Circuit 500 is similar to circuit 400 except the transistor N3 507, which is coupled to different nodes than N3 407 shown in FIG. 4. N3 507 includes a source, drain, and gate terminals. While the source terminal of N3 507 is coupled to the ground power supply, the drain terminal of N3 507 is coupled to the node A. The gate terminal of N3 507 is coupled to the node B.

In one operation, circuit 500 provides a logic high voltage potential as a default value at out2 510 when VCCQ powers up before Vcc. For example, VCCQ could power up before Vcc during an initialization stage. When VCCQ is on while Vcc is off, the voltage potential at both node A and node B begins to increase because N1 405 and N2 406 are both off. N1 405 and N2 406 operate in a function of Vcc because they are gated by input 512, which performs in a function of Vcc. Because Vcc is off, N1 405 and N2 406 are also off. When the voltage potential at the node B reaches to the threshold voltage of N3 507, N3 507 starts to turn on. When N3 507 begins to turn on, the voltage potential at the node A will be pulled down. When the voltage potential goes down at the node A, P2 404 starts to turn on. Once P2 404 begins to turn on, the voltage potential at the node B goes higher, which keeps N3 507 on. Accordingly, a logic high voltage potential at out2 510 is maintained when N3 507 is on.

Figure 5:
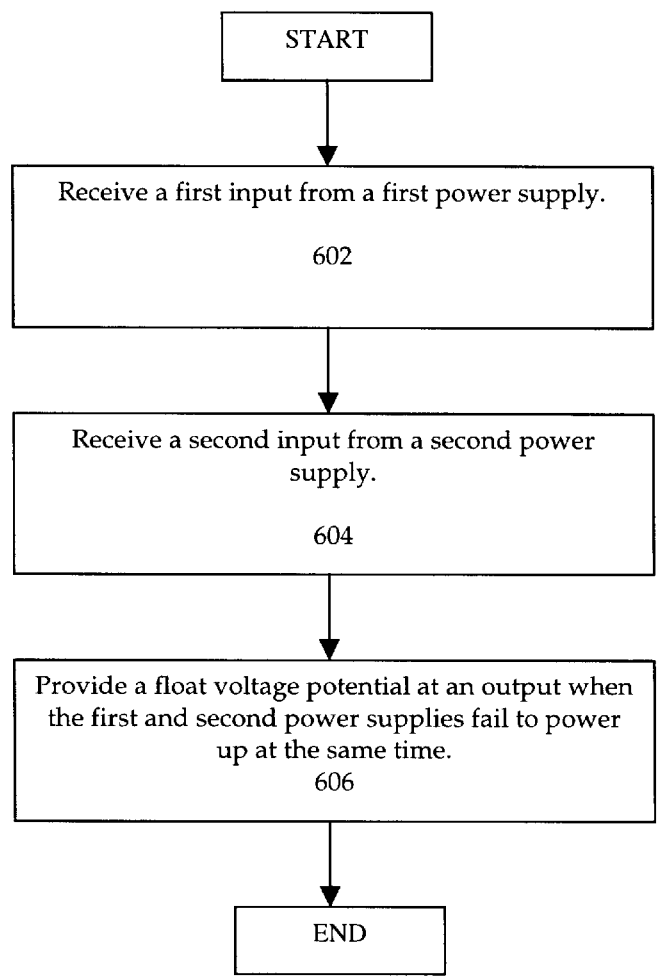
FIG. 5 is a flowchart illustrating a process for providing a float voltage potential.

FIG. 5 is a flowchart 600 illustrating a process for providing a float voltage potential. A process begins at the start block and proceeds to block 602 where the process receives a first input from a first power supply. After block 602, the process proceeds to block 604. At block 604, the process receives a second input from a second power supply. In one example, the first power supply is Vcc power supply and the second power supply is VCCQ power supply. When the process reaches block 606, the process provides a float voltage potential at an output when the first and second power supplies failed to power up at the same time. After block 606, the process ends.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A device comprising:
 a first circuit coupled to a first power supply;
 a second circuit coupled to the first circuit and a second power supply, the second circuit including a first default circuit and a second default circuit to generate a first default voltage potential and a second default voltage potential respectively when the first and second power supplies do not supply power at substantially the same time; and
 a third circuit coupled to the second circuit and configured to provide an output voltage potential at an output in response to the first and second default voltage potentials.

2. The device of claim 1, wherein the first circuit is a latch circuit.

3. The device of claim 1, wherein the third circuit is an input and output (I/O) buffer.

4. The device of claim 1, wherein the first power supply provides Vcc voltage potential and the second power supply provides VCCQ voltage potential.

5. The device of claim 1, wherein the first and second default voltages cause the output voltage potential to be a float voltage potential, which is a logic unknown state, when the first and second power supplies do not supply power at substantially the same time.

6. The device of claim 1, wherein the second power supply is powered up before the first power supply is powered up.

7. A device comprising:
 a first input coupled to a first power supply;
 a second input coupled to a second power supply via a default circuit coupling to the first and second power supplies, the default circuit generating a default voltage potential when the first and second power supplies do not supply power at substantially the same time, and
 an output, to provide a float voltage potential at the output in response to the default voltage potential, when the first and second power supplies do not supply power at substantially the same time.

8. The device of claim 7, further comprising a third input, the third input coupled to a third power supply providing ground voltage potential.

9. The device of claim 7, wherein the device is an input and output buffer.

10. The device of claim 7, wherein the output is further coupled to a bus, which is further coupled to a plurality of circuit components.

11. The device of claim 10, wherein the bus transports one of at least two high voltage potentials between the circuit components.

12. The device of claim 7, wherein the first power supply provides Vcc voltage potential.

13. The device of claim 7, wherein the second power supply provides VCCQ voltage potential.

14. The device of claim 7, wherein the float voltage potential is a logic unknown state.

15. The device of claim 7, wherein the first and second power supplies supply power at different time happens during an initialization state.

16. The device of claim 7, wherein the second power supply is powered up before the first power supply is powered up.

17. A method comprising:
receiving a first input from a first power supply;
receiving a second input from a second power supply;
generating a default signal when the first input and the second input are not received at substantially the same time; and
providing a float voltage potential at an output in response to the default signal when the first and second power supplies fail to power up at substantially the same time.

18. The method of claim 17, wherein the receiving a first input from a first power supply further includes receiving a Vcc voltage potential from the first power supply.

19. The method of claim 17, wherein the receiving a second input from a second power supply further includes receiving a VCCQ voltage potential from the second power supply.

20. The method of claim 17, wherein the providing a float voltage potential at an output further includes supplying a float voltage potential when the second power supply is powered up before the first power supply is powered up.

21. A system comprising:
a storage device;
at least one default device coupled to the storage device; and
an output device coupled to the at least one default device, the output device configured to provide a float state when at least two power supplies provide power at different time, wherein the at least one default device comprises:
a first transistor having source, drain and gate terminals, the source terminal of the first transistor being coupled to a first power supply voltage, the drain terminal of the first transistor being coupled to a node A, the gate terminal of the first transistor being coupled to a node B;
a second transistor having source, drain and gate terminals, the source terminal of the second transistor being coupled to the first power supply voltage, the drain terminal of the second transistor being coupled to the node B, the gate terminal of the second transistor being coupled to the node A;
a third transistor having source, drain and gate terminals, the source terminal of the third transistor being coupled to a second power supply voltage, the drain terminal of the third transistor being coupled to the node A, the gate terminal of the third transistor being coupled to an input;
an inverter having an inverter input and an inverter output, the inverter input of the inverter being coupled to the input;
a fourth transistor having source, drain and gate terminals, the source terminal of the fourth transistor being coupled to the second power supply voltage, the drain terminal of the fourth transistor being coupled to the node B, the gate terminal of the fourth transistor being coupled to the inverter, output of the inverter; and
a fifth transistor having source, drain and gate terminals, the source terminal of the fifth transistor being coupled to the second power supply voltage, the drain terminal of the fifth transistor being coupled to the node B, the gate terminal of the fifth transistor being coupled to the node A.

22. The system of claim 21, wherein the storage device is a latch.

23. The system of claim 21, wherein the at least two power supplies include at least a first power supply providing Vcc voltage potential and a second power supply providing VCCQ voltage potential.

24. The system of claim 21, wherein the float state is a logic unknown state, which is unable to drive a circuit component.

25. The system of claim 21, wherein the output device includes a p-channel transistor and an n-channel transistor.

26. A system, comprising:
a storage device:
a default device coupled to the storage device: and
an output device coupled to the default device, the output device configured to provide a float state when at least two power supplies provide power at different time, wherein the default device comprises:
a first transistor having source, drain and gate terminals, the source terminal of the first transistor being coupled to a first power supply voltage, the drain terminal of the first transistor being coupled to a node A, the gate terminal of the first transistor being coupled to a node B;
a second transistor having source, drain and gate terminals, the source terminal of the second transistor being coupled to the first power supply voltage, the drain terminal of the second transistor being coupled to the node B, the gate terminal of the second transistor being coupled to the node A;
a third transistor having source, drain and gate terminals, the source terminal of the third transistor being coupled to a second power supply voltage, the drain terminal of the third transistor being coupled to the node A, the gate terminal of the third transistor being coupled to an input;
an inverter having an inverter input and an inverter output, the inverter input of the inverter being coupled to the input;
a fourth transistor having source, drain and gate terminals, the source terminal of the fourth transistor being coupled to the second power supply voltage, the drain terminal of the fourth transistor being coupled to the node B, the gate terminal of the fourth transistor being coupled to the inverter output of the inverter; and
a fifth transistor having source, drain and gate terminals, the source terminal of the fifth transistor being coupled to the second power supply voltage, the drain terminal of the fifth transistor being coupled to the node A, the gate terminal of the fifth transistor being coupled to the node B.

* * * * *

UNITED STATES PATENT AND TRADEMARK OFFICE
CERTIFICATE OF CORRECTION

PATENT NO.    : 6,647,500 B1             Page 1 of 1
DATED         : November 11, 2003
INVENTOR(S)   : Kwong It is certified that error appears in the above-identified patent and that said Letters Patent is hereby corrected as shown below:

Column 2,
Line 13, before "component", insert -- one --.

Signed and Sealed this

Thirtieth Day of March, 2004

JON W. DUDAS
*Acting Director of the United States Patent and Trademark Office*